(12) United States Patent
Byron et al.

(10) Patent No.: US 10,534,803 B2
(45) Date of Patent: *Jan. 14, 2020

(54) READABILITY AWARENESS IN NATURAL LANGUAGE PROCESSING SYSTEMS

(71) Applicant: International Business Machines Corporation, Armonk, NY (US)

(72) Inventors: Donna K. Byron, Petersham, MA (US); Devendra Goyal, Ann Arbor, MI (US); Lakshminarayanan Krishnamurthy, Round Rock, TX (US); Priscilla Santos Moraes, Pflugerville, TX (US); Michael C. Smith, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,663

(22) Filed: Feb. 13, 2019

(65) Prior Publication Data
US 2019/0179840 A1    Jun. 13, 2019

Related U.S. Application Data

(63) Continuation of application No. 15/794,282, filed on Oct. 26, 2017, now Pat. No. 10,242,092, which is a
(Continued)

(51) Int. Cl.
*G06F 17/27* (2006.01)
*G06F 16/33* (2019.01)
(Continued)

(52) U.S. Cl.
CPC ........ *G06F 16/3344* (2019.01); *G06F 16/345* (2019.01); *G06F 17/273* (2013.01);
(Continued)

(58) Field of Classification Search
CPC .. G06F 17/274; G06F 16/3344; G06F 16/345; G06F 17/2705; G06F 17/273
(Continued)

(56) References Cited

U.S. PATENT DOCUMENTS 7,389,289 B2    6/2008  Solaro et al.
7,996,400 B2    8/2011  Morris et al.
(Continued)

FOREIGN PATENT DOCUMENTS

CN     103218356 A      7/2013
WO     2004070627 A1    8/2004

OTHER PUBLICATIONS

Hanbury et al., "Report on Automatic Document Categorization, Trustability and Readability", Aug. 31, 2013, Grant Agreement No. 257528, KHRESMOI, pp. 1-32.
(Continued)

*Primary Examiner* — Charlotte M Baker
(74) *Attorney, Agent, or Firm* — Anthony M. Pallone

(57) ABSTRACT

Electronic natural language processing in a natural language processing (NLP) system, such as a Question-Answering (QA) system. A receives electronic text input, in question form, and determines a readability level indicator in the question. The readability level indicator includes at least a grammatical error, a slang term, and a misspelling type. The computer determines a readability level for the electronic text input based on the readability level indicator, and retrieves candidate answers based on the readability level.

18 Claims, 8 Drawing Sheets

Related U.S. Application Data continuation of application No. 14/987,816, filed on Jan. 5, 2016, now Pat. No. 9,910,912.

(51) Int. Cl.
  *G06F 16/34* (2019.01)
  *G06F 17/28* (2006.01)

(52) U.S. Cl.
  CPC ........ *G06F 17/274* (2013.01); *G06F 17/2705* (2013.01); *G06F 17/2765* (2013.01); *G06F 17/28* (2013.01)

(58) Field of Classification Search
  USPC .......................................................... 704/9
  See application file for complete search history.

(56) References Cited

U.S. PATENT DOCUMENTS

| | | | |
|---|---|---|---|
| 8,095,487 B2 | 1/2012 | Jones et al. | |
| 8,122,021 B2 | 2/2012 | White et al. | |
| 8,500,450 B1* | 8/2013 | Taylor | G09B 7/04 434/156 |
| 8,954,423 B2 | 2/2015 | Chica et al. | |
| 2003/0061026 A1* | 3/2003 | Umpleby | G06F 17/2836 704/8 |
| 2007/0067294 A1 | 3/2007 | Ward et al. | |
| 2010/0049498 A1 | 2/2010 | Cao et al. | |
| 2010/0241419 A1 | 9/2010 | Williams | |
| 2011/0087656 A1 | 4/2011 | Oh et al. | |
| 2014/0006012 A1 | 1/2014 | Zhou et al. | |
| 2015/0161230 A1 | 6/2015 | Alkov et al. | |
| 2015/0248398 A1 | 9/2015 | Weiss et al. | |
| 2015/0371137 A1 | 12/2015 | Giffels et al. | |
| 2015/0379087 A1 | 12/2015 | Lee et al. | |
| 2016/0026634 A1 | 1/2016 | Allen et al. | |
| 2016/0048772 A1 | 2/2016 | Bruno et al. | |
| 2016/0342685 A1* | 11/2016 | Basu | G06F 16/367 |
| 2016/0358488 A1 | 12/2016 | Canter et al. | |
| 2017/0193090 A1 | 7/2017 | Byron et al. | |
| 2017/0193091 A1 | 7/2017 | Byron et al. | |
| 2017/0193092 A1 | 7/2017 | Byron et al. | |
| 2017/0193093 A1 | 7/2017 | Byron et al. | |
| 2018/0068014 A1 | 3/2018 | Byron et al. | |
| 2018/0068015 A1 | 3/2018 | Byron et al. | |

OTHER PUBLICATIONS

Sheehan et al., "Generating Automated Text Complexity Classifications That Are Aligned With Targeted Text Complexity Standards", ETS RR-10-28, Dec. 2010, pp. 1-49.

Graesser et al., "Coh-Metrix: Analysis of Text on Cohesion and Language", Behavior Research Methods, Instruments, & Computers, 2004, 36 (2), pp. 193-202.

Kincaid et al. Naval Technical Training Command, "Derivation of New Readability Formulas {Automated Readability Index, Fog Count and Flesch Reading Ease Formula} for Navy Enlisted Personnel", Feb. 1975, Chief of Naval Technical Training Naval Air Station Memphis—Millington, TN, 51 pages.

McLaughlin, "SMOG Grading—A New Readability Formula", Journal of Reading May 1969, pp. 639-646.

Mell et al., "The NIST Definition of Cloud Computing", National Institute of Standards and Technology, Special Publication 800-145, Sep. 2011, pp. 1-7.

Reilly et al., "Ballot Question Readability and Roll-Off: The Impact of Language Complexity", http://prq..sagepub.com/content/64/1/59. abstract, printed Jan. 4, 2016, 1 page.

Gossen et al., "What are the Real Differences of Children's and Adult's Web Search?", Proceedings of the 34th International ACM SIGIR Conference on Research and Development in Information Retrieval, ACM, Jul. 24-28, 2011, Beijing, China, pp. 1-2.

Collins-Thompson et al., "Personalizing Web Search Results by Reading Level," Proceedings of the 20th ACM International Conference on Information and Knowledge Management, CIKM '11, Oct. 24-28, 2011, Glasgow, Scotland, UK, Copyright 2011, ACM, pp. 1-10.

Liu et al., "Automatic Recognition of Reading Levels from User Queries," Proceedings of the 27th Annual International ACM SIGIR Conference on Research and Development in Information Retrieval, SIGIR '04, Jul. 25-29, 2004, Sheffield, South Yorkshire, UK, ACM, pp. 1-2.

Paukkeri et al., "Assessing user-specific difficulty of documents," Information Processing and Management, 49.1, 2013, pp. 198-212.

IBM: List of IBM Patents or Patent Applications Treated As Related (Appendix P), Feb. 14, 2019, pp. 1-2.

IBM: List of IBM Patents or Patent Applications Treated As Related (Appendix P), Jul. 25, 2019, pp. 1-2.

Pending U.S. Appl. No. 16/445,825, filed Jun. 19, 2019, entitled: "Readability Awareness in Natural Language Processing Systems", 58 pages.

\* cited by examiner

READABILITY AWARENESS IN NATURAL LANGUAGE PROCESSING SYSTEMS

BACKGROUND

Embodiments of the invention generally relate to electronic natural language processing, and more particularly, to identifying readability levels of a user question and natural language documents based readability indicators.

Traditional systems estimate a user's reading level by analyzing relatively large datasets, associated with the user, over several iterations. The more text samples that are analyzed, the more likely that the analysis yields reliable results. For example, some metrics that these systems use are: average word length and average words per sentence.

SUMMARY

According to an aspect of the invention, a method is provided for electronic natural language processing in an electronic natural language processing system. The method receives an electronic text input, and determines a readability level indicator of the electronic text input. The readability level indicator includes at least one of a grammatical error, a slang term, and a misspelling type in the electronic text input. The method determines a readability level of the electronic text input based on the readability level indicator.

According to a further aspect of the invention, a computer system for electronic natural language processing is provided. The system includes one or more computer devices each having one or more processors and one or more tangible storage devices, and a program embodied on at least one of the one or more storage devices. The program has a plurality of program instructions for execution by the one or more processors. The system receives an electronic text input, and determines a readability level indicator of the electronic text input. The readability level indicator includes at least one of a grammatical error, a slang term, and a misspelling type in the electronic text input. The system determines a readability level of the electronic text input based on the readability level indicator.

According to a further aspect of the invention, a computer program product for electronic natural language processing is provided. The computer program product includes a non-transitory tangible storage device having program code embodied therewith. The program code is executable by a processor of a computer to perform a method. The method receives an electronic text input, and determines a readability level indicator of the electronic text input. The readability level indicator includes at least one of a grammatical error, a slang term, and a misspelling type in the electronic text input. The method determines a readability level of the electronic text input based on the readability level indicator.

According to a further aspect of the invention, a method for electronic natural language processing in an electronic natural language processing system, is provided. The method receives a set of natural language documents and determines readability level indicators in the set of natural language documents. The method provides, in response to receiving a query text, at least one natural language document whose readability level is within a threshold distance of a readability level of the query text. The readability level of the query text is based on one or more readability level indicators including at least one of a grammatical error, a slang term, and a misspelling type in the query text.

According to a further aspect of the invention, a computer system for electronic natural language processing, is provided. The system includes one or more computer devices, each having one or more processors and one or more tangible storage devices, and a program embodied on at least one of the one or more storage devices. The program has a plurality of program instructions for execution by the one or more processors. The system receives a set of natural language documents and determines readability level indicators in the set of natural language documents. The system provides, in response to receiving a query text, at least one natural language document whose readability level is within a threshold distance of a readability level of the query text. The readability level of the query text is based on one or more readability level indicators including at least one of a grammatical error, a slang term, and a misspelling type in the query text.

According to a further embodiment of the invention, a computer program product for electronic natural language processing is provided. The computer program product includes a non-transitory tangible storage device having program code embodied therewith. The program code is executable by a processor of a computer to perform a method. The method receives a set of natural language documents and determines readability level indicators in the set of natural language documents. The method provides, in response to receiving a query text, at least one natural language document whose readability level is within a threshold distance of a readability level of the query text. The readability level of the query text is based on one or more readability level indicators including at least one of a grammatical error, a slang term, and a misspelling type in the query text.

DETAILED DESCRIPTION

It may be desirable for a natural language processing (NLP) system, such as a Question-Answering (QA) system, to tailor its answers to a user based on the user's reading and comprehension ability. That is, although the QA system may have the correct answer to the user's question, the user may not understand the answer because there is potentially a mismatch between the user's reading level and the answer's readability level.

Consider, for example, a lay user interested in learning more about an illness whose study is highly specialized. The user may ask the QA system: "What causes X?", where "X" is an illness whose study is highly specialized. A traditional QA system may retrieve several answers that represent the most relevant, rich, and up-to-date content associated with illness X. However, assume that the answers are found in a highly technical scientific journal. The layperson is unlikely to have the pre-requisite knowledge, reading ability, or comprehension level, to understand the answers. In some circumstances, therefore, what may be considered as the best answer under some criteria (for example, relevance and completeness) may not be the best answer for a given user. That is, the user may find it more helpful to receive answers that, while less robust, are easier to grasp.

Accordingly, embodiments of the invention provide a method, system, and computer program product, for electronic natural language processing (NLP) on an NLP system. Embodiments of the invention may be deployed on one or more computers in an NLP computing environment, to execute instructions of a program to carry out a method. The instructions may be stored on one or more tangible storage devices of the NLP computing system. The tangible storage device may be part of, or operatively connected to, the computer.

According to an aspect of the invention, a user may provide the NLP system with a single sentence, which may be in the form of a question. The NLP system may analyze the text to estimate the user's reading ability, and to tailor its responses to the text based on the identified reading level.

According to an aspect of the invention, the NLP system may determine the user's readability level based on relatively small text samples. Some embodiments may determine the readability level of a single sentence or smaller text fragments.

Figure 1:
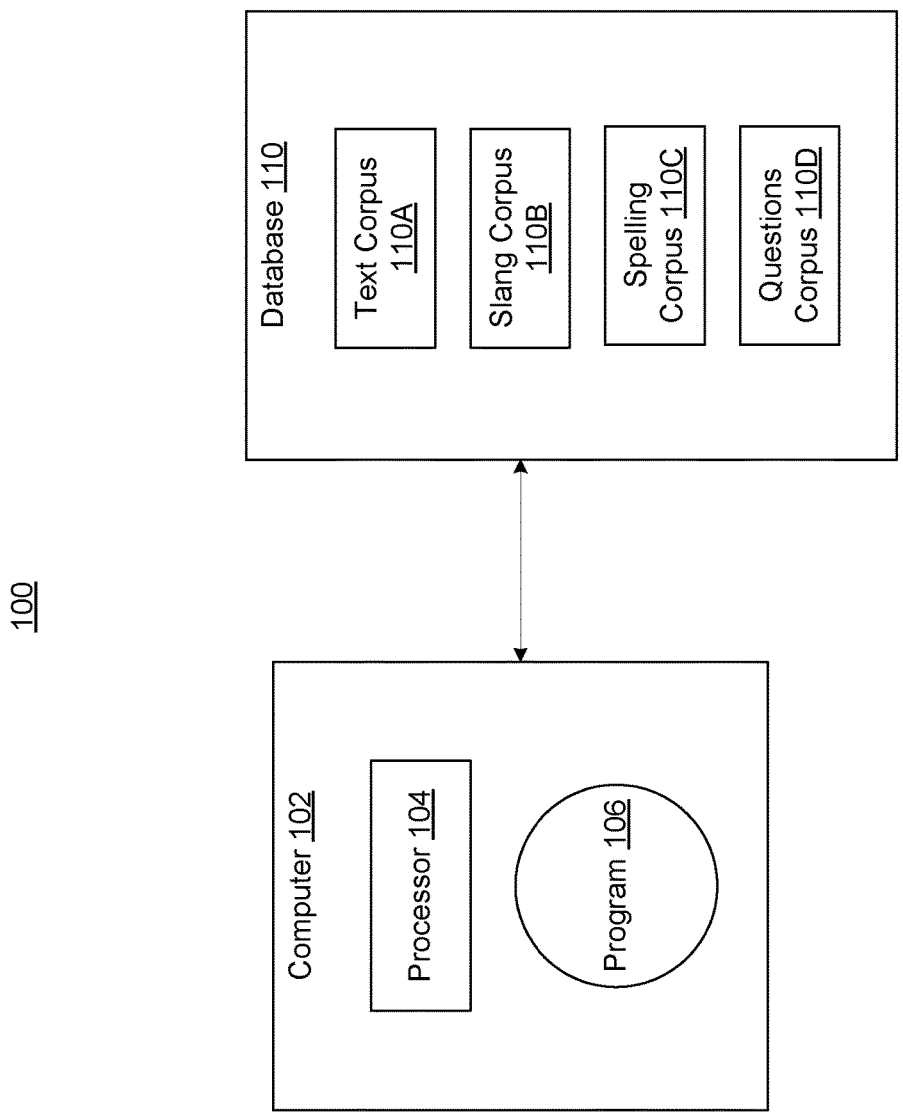
FIG. 1 is a block diagram of a natural language processing (NLP) computing environment, according to an embodiment of the invention.

FIG. 1 is a functional block diagram of an NLP computing environment 100, according to an embodiment of the invention. NLP computing environment 100 includes a computer 102 having a processor 104, and a program 106 stored on a tangible storage device of computer 102. Instructions of program 106 may be executable by processor 104. Program 106 may include a set of instructions for parsing electronic text inputs; this set of instructions is referred to as a parser. Additional details of these components, according to embodiments of the invention, are provided in connection with FIGS. 6-8, below.

Generally, computer 102 may receive an electronic text input (for example, from a user) and provide one or more texts in response to receiving the electronic text input. In one embodiment, the received electronic text input may be in the form of a question, and text provided in response may be in the form of an answer to that question. A question may have one or more answers, and an answer may be responsive to one or more questions. This is for illustration purposes only, and does not limit embodiments of the invention; the received electronic text input need not be a question, and the text provided in response need not be an answer. In one example, the received electronic text input may be an answer and the text provided in response may be a question.

Generally, texts used by computer 102 (be they questions or answers) may be defined as having corresponding readability characteristics, or features, that define the texts' readability levels. A readability levels refers to a grouping of texts based on common or predefined readability characteristics or features.

Examples of readability characteristics or features include, without limitation: number of words; number of words other than common words; average word length; number of words found exclusively in a particular dictionary (for example, a technical dictionary may have words not found in other dictionaries; using words found in the technical dictionary may suggest a readability level corresponding to a high educational achievement classification); and use of passive voice.

Examples of readability levels include, without limitation: grade levels (for example, 1-12 grades, undergraduate levels, etc.); professional role or expertise (for example, professor, lawyer, scientist); absolute numerical scores (for example, a range of 0 to 1); and relative numerical scores (for example, −1 to 1).

Data used to define and determine readability levels and readability characteristics may be stored in one or more databases 110 operatively connected to computer 102. These include, in the depicted embodiment, a text corpus 110A database, a slang corpus 110B database, a spelling corpus 110C, and a questions corpus 110D database. Computer 102 may use information in these databases to analyze the question to determine its readability characteristics, and to determine one or more appropriate answers.

Text corpus 110A may include one or more texts of various lengths having associated readability levels and readability characteristics. These properties may be predefined, or determined periodically. Readability characteristics of texts stored in text corpus 110A may be used, by embodiments of the invention, as reference points for identifying readability characteristics of other texts analyzed by computer 102.

In one example, text corpus 110A may include text derived from various data sources, including, for example, the Internet, and any data that is manually provided or automatically scanned (for example, by a web crawler). Texts in text corpus 110A may include formal and informal texts, each having a defined set of readability characteristics.

In one example, formal text may be defined as text having readability characteristics that are the same as, or similar to, text used in the Common Cores Standards by the National Governors Association Center for Best Practices and the Council of Chief State School Officers ("Common Core"). In a further example, informal text may be defined as text having readability characteristics that are the same as, or similar to, text used in blogs, community forums, and social media platforms. The specific characteristics that identify a given text as formal or informal depend on specific implementations of the invention, and may be defined differently from one embodiment to another. Furthermore, their respective definitions may evolve over time based on changes in language usage.

In one embodiment, computer 102 may periodically or continuously monitor various data sources (such as the Internet) to analyze and/or collect various text corpora and to assess their readability characteristics. Computer 102 may assign these texts corresponding readability levels. Computer 102 may use text corpus 110A as a reference point in evaluating other texts.

Slang corpus 110B may include words, phrases, or other text that is defined as slang. According to an aspect of the invention, slang terms may be defined as readability characteristics associated with various readability levels. In one embodiment, this information may be encapsulated in a slangs table including a listed of slang terms having associated readability characteristics, such as readability scores. For example, the term "aint't" may be defined as a slang term, and may be assigned an associated readability level, or an associated readability score (for example, (−0.1)), or both. In this example, appearance of the term "ain't" may contribute a (−0.1), in the question may contribute a score of (−0.1) to the overall score of the question. In an embodiment, the slang term may be identified as an abbreviation of a word corresponding to an acronym associated with the word in a collection of text messaging acronyms.

Computer 102 may use various rules to determine readability levels of the question and the answer based on slang terms. In one embodiment, the impact of slang terms in the question may be based on an aggregation of the scores of all slang terms appearing in the question. In another embodiment, an average may be used. In another embodiment, only the highest score in absolute value may be used. In an embodiment, the mere occurrence of a slang term in a question may result in the question receiving a readability level without use of readability scores. Other rules are possible.

Spelling corpus 110C may include definitions of various misspelling types along with associated effects on readability levels of a given text. Computer 102 may analyze a user's question to identify which misspelling types appear in the question, and to evaluate the effect of the identified misspelling types on the question's readability level.

For example, one misspelling type may be one in which a misspelled letter appears within a predefined distance from the correct letter on a keyboard (the distance may be measured, in one embodiment, as the number of keys between the correct letter and the misspelled letter). This type of misspelling may be assigned a negative readability score that is relatively insignificant, since it may be more indicative of the user's typing ability than the user's educational level (the educational level being measured through the readability level). As a further example, some words in a question may be misspelled because the user has relatively little experience with seeing the word in written form, suggesting that the question (and by proxy, the user posing it) has a relatively low readability level. For example, using "their" when intending "there" may be an indication of a relatively low readability score.

Examples of additional misspelling types include: long versus short words (misspelling short words may have a higher impact on readability level than misspelling long words); word sophistication; word usage statistics in texts having associated readability characteristics; number of auto-corrections of the input text during the text input process (a question may have no misspellings once the user submits the question, but the question intake process may have included several auto-corrections of misspelled words). In an embodiment, the misspelling may correspond to a phonetic reading of the word that differs from its correct spelling.

Questions corpus 110D may include one or more questions having associated readability levels and readability characteristics. Readability levels and characteristics for questions in this corpus may be similarly defined and associated as described above in connection with text corpus 110A. In one embodiment, questions may be added to this corpus based on outputs of program 106 derived as a consequence of executing one or more steps of method 200 (FIG. 2) executed by program 106. Iterative executions of method 200 may yield results that may be used to train a model. The trained model may be used as a point of reference in evaluating other questions in future iterations of method 200. For example, similarities between a new question, and several old questions having the same readability score, may increase the likelihood that method 200 assigns the readability score of the old questions to the new question.

Additional embodiments of the invention may include one or more databases that may be used to determine the readability level of the question. These may include, without limitation, a technical database (having a list of technical terms and associated impact of using those terms on the question's score); sophisticated words (some words are likely to be known by users having a minimum readability level).

Figure 2:
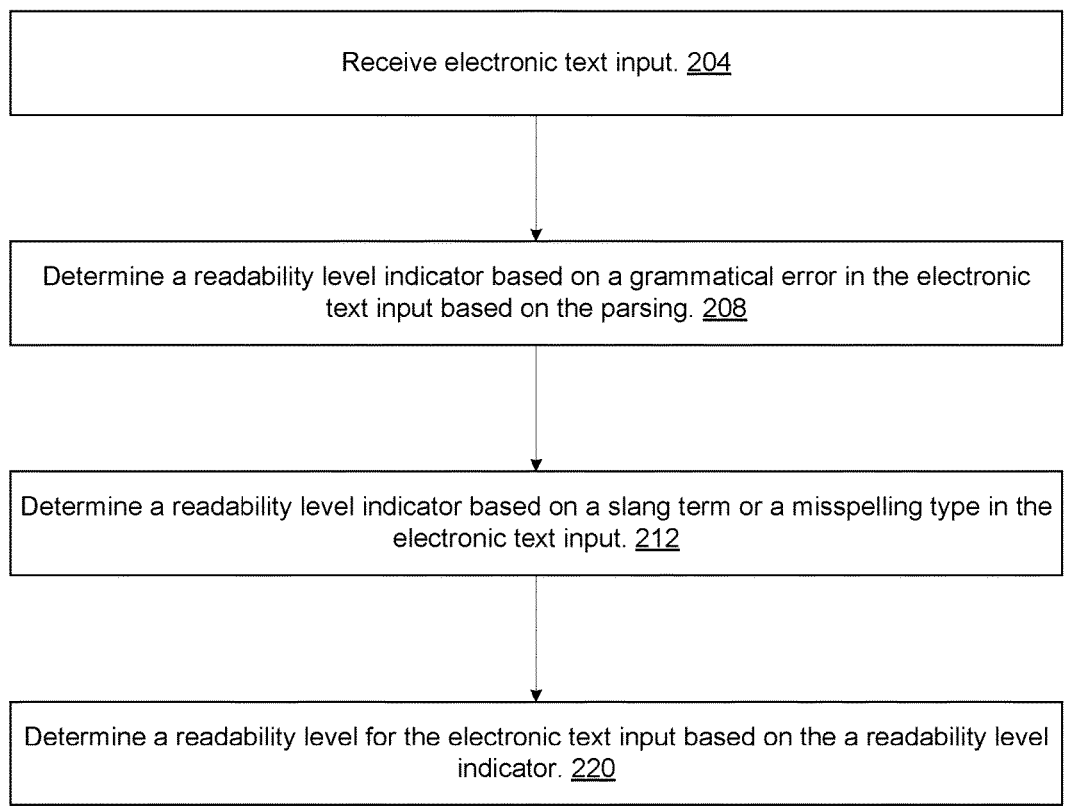
FIG. 2 is a flow chart of a method for analyzing a text input in the NLP computing environment of FIG. 1, according to an embodiment of the invention.

FIG. 2 is a flowchart of a method 200 for electronic natural language processing in NLP computing environment 100 (FIG. 1), according to an embodiment of the invention. Steps of method 200 may be embodied as instructions of program 106 on the tangible storage device of computer 102 and executed by processor 104 (FIG. 1).

Referring now to FIGS. 1 and 2, computer 102 may receive an electronic text input, which may be in the form of a question (hereinafter, "the question"). Computer 102 may receive the question from an electronic input source. The electronic input source may be operatively connected to computer 102. The operational connectivity may be local to computer 102 (for example, a keyboard or other input/output (I/O) source), or a remote (for example, a network communication on a distributed or cloud computing platform), or a combination thereof.

Computer 102 may parse the received question to determine its constituents and their respective properties (at 204). In one embodiment, computer 102 may use a deep parsing technique, such as an English Slot Grammar (ESG) parser and a predicate-argument structure (PAS) builder. With these tools, computer 102 may generate one or more parse trees for the question (each tree may be scored based on a scoring criteria).

Based on the parsing/deep parsing operations (at 204), computer 102 may process the question to determine a readability level indicator for the question. Computer 102 may determine the readability level indicator, in one instance, by identifying one or more grammatical errors in the question (at 208). Each type of grammatical error may be assigned a corresponding score that determines its impact on the readability score of the question. For example, computer 102 may identify one or more of the following grammatical errors: lack of subject/verb agreement (for example, "I jumps"); possessive mistakes (for example, "men's" versus "mens"; wrong but phonetically similar word choice ("you're" versus "your"); and many others. Some grammatical errors may be considered more significant than others, and their corresponding scores may reflect this consideration.

Computer 102 may further identify a readability level indicator by identifying a slang term in the question (at 212). A slang term appearing in a question may be defined as indicative of a relatively low readability score. Accordingly, a slang term may be assigned a corresponding readability score that lowers the question's overall readability score. Computer 102 may consult slang corpus 110B to determine whether a given word in the question is a slang term.

In one example, if the question includes the term "ain't" rather than "is not", computer 102 may detect that "ain't" is a slang term, and that its use suggests a lower readability level for the user asking the question than might otherwise have been the case. If this slang term has an associated negative readability score, computer 102 may apply this score to the question, as defined by corresponding rules, as described above. If the slang term has an associated readability level, computer 102 may apply this readability level to the question, as defined by corresponding rules, as described above.

Computer 102 may further identify a readability level indicator by identifying a misspelling in the question and further identifying a corresponding misspelling type (at 212). A misspelling appearing in a question may be defined as indicative of a relatively low readability score. Accordingly, misspellings may be assigned to categories or types, and corresponding scores that lower the question's overall readability score. Computer 102 may identify misspellings by consulting an electronic dictionary, and may consult spelling corpus 110C to determine the misspelling type and its impact on the question's readability level.

Computer 102 may determine a readability score (or a readability level) for the question based on determining the readability level indicator (at 220). Computer 102 may determine the readability level by considering one or more of the readability level indicators that computer 102 determines throughout steps of method 200. For example, computer 102 may consider any one or more of grammatical errors, misspelling types, and slang term usage in the question. Depending on the particular rules that computer 102 applies, these indicators may be given equal or disparate treatment.

In one embodiment, computer 102 may determine the readability level by analyzing individual readability scores for the question (based on grammatical errors, misspelling types, slang term usage, or a combination thereof), to arrive at a final readability level. In another embodiment, computer 102 may compare the determined readability scores (or the readability characteristics) for the question with readability scores/characteristics of various texts in text corpus 110A.

In one example, the question may be assigned the readability level of a text with which the question shares a predetermined number of readability characteristics (for example, both the question and the text use the same slang term in conjunction with the same misspelling type).

Figure 3:
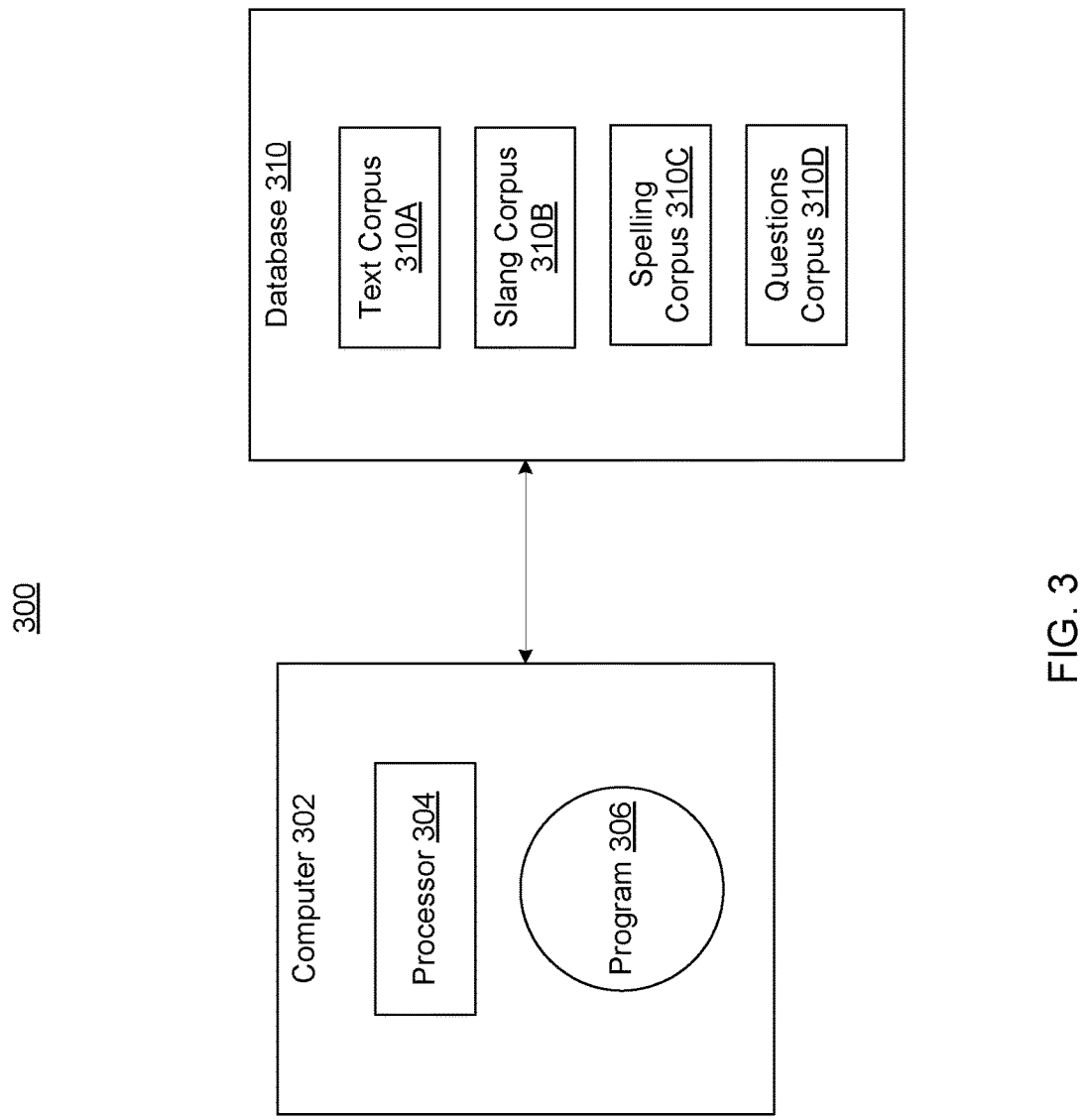
FIG. 3 is a block diagram of a natural language processing (NLP) computing environment, according to an embodiment of the invention.

FIG. 3 is a block diagram of a natural language processing (NLP) computing environment 300, according to an embodiment of the invention. Aspects of NLP computing environment 300 are similar to NLP computing environment 100 (FIG. 1), and like elements bearing a reference number in the (100) range are similarly numbered in the (300) range. However, like numbering does not necessarily require like functionality.

Generally, NLP computing environment 300 includes a computer 302 having a processor 304, and a program 306 stored on a tangible storage device of computer 302. Instructions of program 306 may be executable by processor 304. Program 306 may include a set of instructions for parsing electronic text inputs; this set of instructions is referred to as a parser. Additional details of these components, according to embodiments of the invention, are provided in connection with FIGS. 6-8, below.

Generally, computer 302 receives electronic natural language documents for processing according to their readability levels, and to provide such documents, or portions thereof, in response to receiving an input (for example, from a user). For example, computer 302 generally may receive natural language documents in a text corpus, index the documents according to their features, including their readability indicators, and determine their readability levels. In an embodiment, computer 302 may determine readability levels for portions of documents.

Generally, natural language documents processed by computer 302 may be defined as having corresponding readability characteristics, or features, that define the texts' readability levels. A readability level refers to a grouping of texts based on common or predefined readability characteristics or features.

Examples of readability characteristics or features include, without limitation: number of words per sentence; number of words other than common words; average word length; number of words found exclusively in a particular dictionary (for example, a technical dictionary may have words not found in other dictionaries; using words found in the technical dictionary may suggest a readability level corresponding to a high educational achievement classification); grammatical construction of a sentence pertaining to, for example, the number of subordinating conjunctions or the noun phrase depth; and use of passive voice.

Examples of readability levels include, without limitation: grade levels (for example, 1-12 grades, undergraduate levels, etc.); professional role or expertise (for example, professor, lawyer, scientist); absolute numerical scores (for example, a range of 0 to 1); and relative numerical scores (for example, −1 to 1).

Data used to define and determine readability levels and readability characteristics may be stored in one or more databases 310 operatively connected to computer 302. These include, in the depicted embodiment, a text corpus 310A database, a slang corpus 310B database, a spelling corpus 310C, and a questions corpus 310D database. Computer 302 may use information in these databases to analyze the question to determine its readability characteristics, and to determine one or more appropriate answers.

Text corpus 310A may include one or more texts of various lengths having associated readability levels and readability characteristics. Computer 302 may periodically receive and process natural language documents for storing in text corpus 310A. Readability characteristics of texts stored in text corpus 310A may be used, by embodiments of the invention, as reference points for identifying readability characteristics of other texts analyzed by computer 302.

In one example, text corpus 310A may include text derived from various data sources, including, for example, the Internet, and any data that is manually provided or automatically scanned (for example, by a web crawler). Texts in text corpus 310A may include formal and informal texts, each having a defined set of readability characteristics.

In one example, formal text may be defined as text having readability characteristics that are the same as, or similar to, text used in the Common Cores Standards by the National Governors Association Center for Best Practices and the Council of Chief State School Officers ("Common Core"). In a further example, informal text may be defined as text having readability characteristics that are the same as, or similar to, text used in blogs, community forums, and social media platforms. The specific characteristics that identify a given text as formal or informal depend on specific implementations of the invention, and may be defined differently from one embodiment to another. Furthermore, their respective definitions may evolve over time based on changes in language usage.

In one embodiment, computer 302 may periodically or continuously monitor various data sources (such as the Internet) to analyze and/or collect various text corpora and to assess their readability characteristics. Computer 302 may assign these texts corresponding readability levels. Computer 102 may use text corpus 310A as a reference point in evaluating other texts.

Slang corpus 130B may include words, phrases, or other text that is defined as slang. According to an aspect of the invention, slang terms may be defined as readability characteristics associated with various readability levels. In one embodiment, this information may be encapsulated in a slangs table including a listed of slang terms having associated readability characteristics, such as readability scores. For example, the term "aint't" may be defined as a slang term, and may be assigned an associated readability level, or an associated readability score (for example, (−0.1)), or both. In this example, appearance of the term "ain't" in the question may contribute a net effect of (−0.1) to the overall score of the question.

Computer 302 may use various rules to determine readability levels of the question and the answer based on slang terms. In one embodiment, the impact of slang terms in the question may be based on an aggregation of the scores of all slang terms appearing in the question. In another embodiment, an average may be used. In another embodiment, only the highest score in absolute value may be used. In an embodiment, the mere occurrence of a slang term in a question may result in the question receiving a readability level without use of readability scores. Other rules are possible.

Spelling corpus 310C may include definitions of various misspelling types along with associated effects on readability levels of a given text. Computer 302 may analyze a user's question to identify which misspelling types appear in the question, and to evaluate the effect of the identified misspelling types on the question's readability level.

For example, one misspelling type may be one in which a misspelled letter appears within a predefined distance from the correct letter on a keyboard (the distance may be measured, in one embodiment, as the number of keys between the correct letter and the misspelled letter). This type of misspelling may be assigned a negative readability score that is relatively insignificant, since it may be more indicative of the user's typing ability than the user's educational level (the educational level being measured through the readability level). As a further example, some words in a question may be misspelled because the user has relatively little experience with seeing the word in written form, suggesting that the question (and by proxy, the user posing it) has a relatively low readability level. For example, using "their" when intending "there" may be an indication of a relatively low readability score.

Examples of additional misspelling types include: long versus short words (misspelling short words may have a higher impact on readability level than misspelling long words); word sophistication; word usage statistics in texts having associated readability characteristics; and number of auto-corrections of the input text during the text input process (a question may have no misspellings once the user submits the question, but the question intake process may have included several auto-corrections of misspelled words).

Questions corpus 310D may include one or more questions having associated readability levels and readability characteristics. Readability levels and characteristics for questions in this corpus may be similarly defined and associated as described above in connection with text corpus 310A. In one embodiment, questions may be added to this corpus based on outputs of program 306 derived as a consequence of executing one or more steps of method 200 (FIG. 2) executed by program 306. Iterative executions of method 200 may yield results that may be used to train a model. The trained model may be used as a point of reference in evaluating other questions in future iterations of method 200. For example, similarities between a new question, and several old questions having the same readability score, may increase the likelihood that method 200 assigns the readability score of the old questions to the new question.

Additional embodiments of the invention may include one or more databases that may be used to determine the readability level of the question. These may include, without limitation, a technical database (having a list of technical terms and associated impact of using those terms on the question's score); sophisticated words (some words are likely to be known by users having a minimum readability level).

Figure 4:
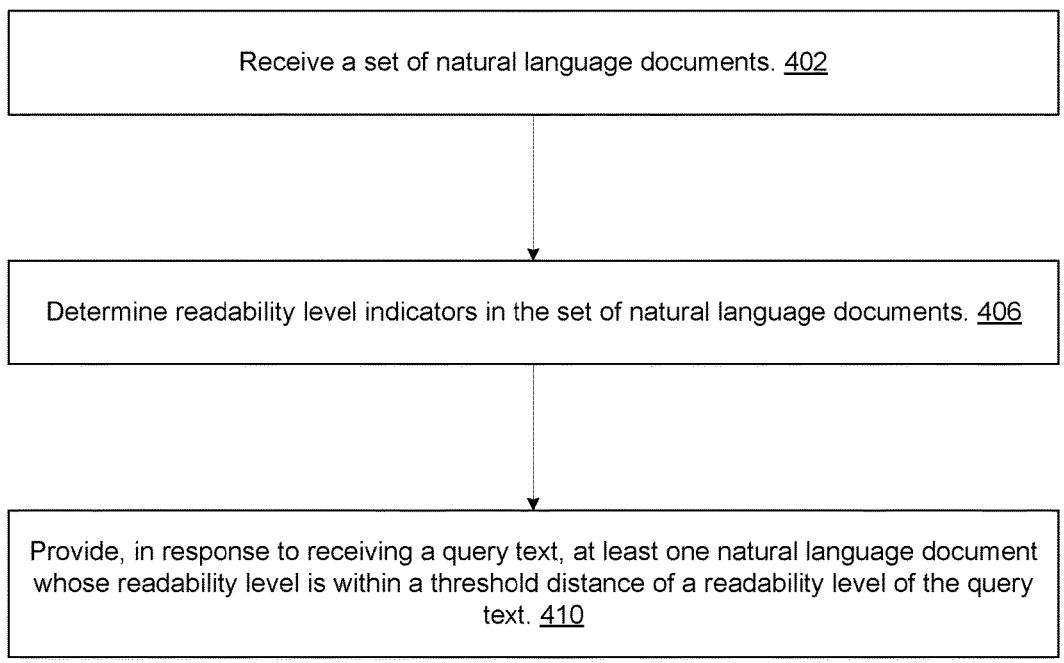
FIG. 4 is a flowchart of a method for analyzing a text input in the NLP computing environment of FIG. 4, according to an embodiment of the invention.

FIG. 4 is a flowchart of a method 400 for electronic NLP processing by an electronic NLP system, according to an embodiment of the invention. Steps of method 400 may be embodied as instructions of program 306 on the tangible storage device of computer 302 and executed by processor 304 (FIG. 3).

Referring now to FIGS. 3 and 4, steps of method 400 will now be described in connection with NLP computing environment 300. Computer 302 receives a set of electronic natural language documents (step 402) from a document source, such as text corpus 310A, another database. Alternatively, computer 302 may receive documents returned by a search engine in response to a query. The process of receiving documents for analysis may be referred to as "ingestion."

Computer 302 determines (step 406) readability levels for the set of natural language documents that it has received (step 402) by detecting and evaluating readability level indicators in the documents, such as indicators that determine the document's formality or informality. The readability level indicators that computer 302 may consider are varied, and may differ from one embodiment of the invention to another. In one embodiment, the readability level indicators include one or more of a grammatical error, a slang term, and a misspelling. Other factors that may be considered include: average inverse-document-frequency (IDF) of words given a formal reference text corpus; average IDF of words given a non-formal text corpus; average word length; a normalized count of the number words per document; number of words per sentence; a normalized count of the number characters per document; number of characters per sentence; number verbs, nouns, adverbs, or other word types per sentence; and number of instances of passive voice, gerunds, or other syntax used per sentence.

In an embodiment, computer 302 may associate a readability level indicator detected in a given natural language document (step 406) with the specific portion of that document in which the indicator is detected. This allows computer 302 to classify portions of a given document differently, via other steps of method 400.

In an embodiment, computer 302 may determine (step 406) the readability level of a document based in part on whether the language used in a given document is formal or informal. In one example, formal text may be defined as text having readability characteristics that are the same as, or similar to, text used in the Common Cores Standards by the National Governors Association Center for Best Practices and the Council of Chief State School Officers ("Common Core"). In a further example, informal text may be defined as text having readability characteristics that are the same as, or similar to, text used in blogs, community forums, and social media platforms. The specific characteristics that identify a given text as formal or informal depend on specific implementations of the invention, and may be defined differently from one embodiment to another. Furthermore, their respective definitions may evolve over time based on changes in language usage.

In an embodiment, the determination that a document is formal or informal may be based, in part, on results of periodic or continuous analysis of documents from various data sources (such as the Internet), which analyze and/or collect various text corpora and to assess their readability characteristics. Computer 302 may assign these texts corresponding readability levels to indicate their level of formality. Computer 302 may use text corpus 310A as a reference point in evaluating other texts during successive processing.

In an embodiment, determining a document's readability level may be performed using, in part, a support machine vector (SMV) classifier, which takes into account grammatical and syntactic features of lexical items in the document.

Computer 302 provides (step 410), in response to a query text, at least one natural language document, or a portion of a natural language document, whose readability level is within a threshold distance of a readability level of the query text. As part of this process, computer 302 receives a query text (for example, a question from a user), and determines a corresponding readability level for the query text. Computer 302 queries text corpus 310A to identify natural language documents that may serve as candidate answers (or candidate documents to provide in response to the input text). In doing so, computer 302 considers not only a given document's relevance to the query text, but also its readability level.

In providing (410) at least one natural language document, or a portion thereof, in response to the query text, computer 302 may determine the query text's readability level based on a readability level indicator in the query text, including at least one of a grammatical error, a slang term, and a misspelling type in the query text. In an embodiment, determining the query text's readability level may be based on retrieving an assigned readability level of the query text (for example, a given query text may be defined as having a particular readability level; this may be useful in training data models). In an embodiment, determining the query text's readability level may be based on executing method 200 (FIG. 2). In an embodiment, determining the query text's readability level may be based on retrieving a stored readability level previously determined for the query text.

In one embodiment, computer 302 provides (step 410) a natural language document in response to the query text only where the two have an identical readability level. In another embodiment, computer 302 provides a document whose readability level is within a defined threshold distance from the query text's readability level (i.e., a difference in readability values). In another embodiment, computer 302 provides a ranked list of natural language documents, where the ranking is based on the readability level of the documents. In an embodiment, the readability level of a natural language document to be provided is one of several factors that determines its rank, or whether it is provided at all in response to the query text.

In an embodiment, computer 302 provides (step 410), in response to the query text, a set of documents having a score that measures both their relevance and readability level, where the score matches a defined criteria. For example, only the top 5 scoring documents may be returned. As a further example, all documents whose score meet a defined threshold value may be returned. The score may be defined, in one embodiment, as the solution to Function 1, a function defined as:

$$\text{score}(q, d) = \frac{V(q) \cdot V(d)}{|V(q)|} \cdot \alpha \cdot \frac{1}{|\text{complexity}_q - \text{complexity}_d|}$$

$\alpha$ = hyperparameter where (q) represents a query text, and (d) represents a candidate natural language document; V(q) and V(d) represent respective binary vectors of words (or other elements) in the query text and the candidate document; (a) is a tuning parameter, and complexity$_q$ and complexity$_d$ represent readability levels that computer 302 determines for each of the query text and the candidate document. For each document analyzed, computer 302 may evaluate a pairing of the query text and the document according to this score function. Computer 302 may then provide the user with documents whose score is within a defined threshold value.

Referring to an example ("Example 1") that illustrates operation of method 400, as described above, computer 302 may receive a set of natural language documents from a database for processing. The documents in this example may relate to the healthcare domain. The documents may include formal text documents, such as medical text books, scientific journals, medical dictionaries, and other documents using language that is defined as formal. The documents may also include informal text, such as blog posts, online forum discussions, and other text, which may be identified as having an author who is not a recognized medical professional, or whose expressed language does not meet formality requirements.

Continuing with Example 1, computer 302 identifies readability level indicators in the medical-domain natural language documents that it has received. For example, computer 302 determines that a given document is formal or informal, and whether it belongs to a certain level (for example, the document is at the readability level of an uneducated person, a lay person, a medical student, a medical professional, a medical expert, etc.).

Continuing with Example 1, computer 302 receives a query text (for example, the question "is exercising recommended for MS patients?" from a user. Computer 302 analyzes the query text to identify readability indicators, such as misspellings, slang terms, or grammatical errors, to determine the user's likely readability level. Computer 302 queries text corpus 310A to retrieve answers that, while relevant, are of an appropriate readability level for the user. This process provides the user with information that the user can understand, because, to the user, an unintelligible answer may be as useless as a wrong answer.

In other steps of method 400 (not shown), according to embodiments of the invention, computer 302 may perform one or more of the following functions. In an embodiment, computer 302 may train a data model over successive iterations of method 400 to determine readability levels for a natural language document or a query text. For example, a natural language document having a particular set of readability indicators may be defined as belonging to a particular reading level. The particular set of readability indicators may be defined based on a common (or average, median, or other measure of commonality) set of readability indicators of all or a subset of the documents in that reading level. As more documents or query texts are added to respective data models, the data models may be updated to reflect characteristics of the added material.

In an embodiment, steps of method 400 may be performed as part of a processing pipeline in a question-and-answering (QA) system. Method 400 may be executed in multiple parallel instances, and its results may be scored and ranked. Other pipelines in the QA system may provide computer 302 with their outputs, and computer 302 may provide the outputs of the method 400 processing pipelines to other pipelines in the QA system.

In an embodiment, in response to receiving an answer from computer 302, a user may indicate whether the provided answer(s) is intelligible to the user. Computer 302 may receive this indication from the user based on a variety of indicators, such as a user interface component operable by the user (for example, a button labeled "this answered my question"), or a subsequent action taken by the user (for example, the user activates a functionality that is expected only if the user would have understood the answer).

In an embodiment, computer 302 may assign different readability levels to different portions of a given natural language document. A portion of a natural language document may include, without limitation, a term, phrase, clause, sentence, paragraph, page, chapter, volume, edition, or other grouping of natural language text.

Figure 5:
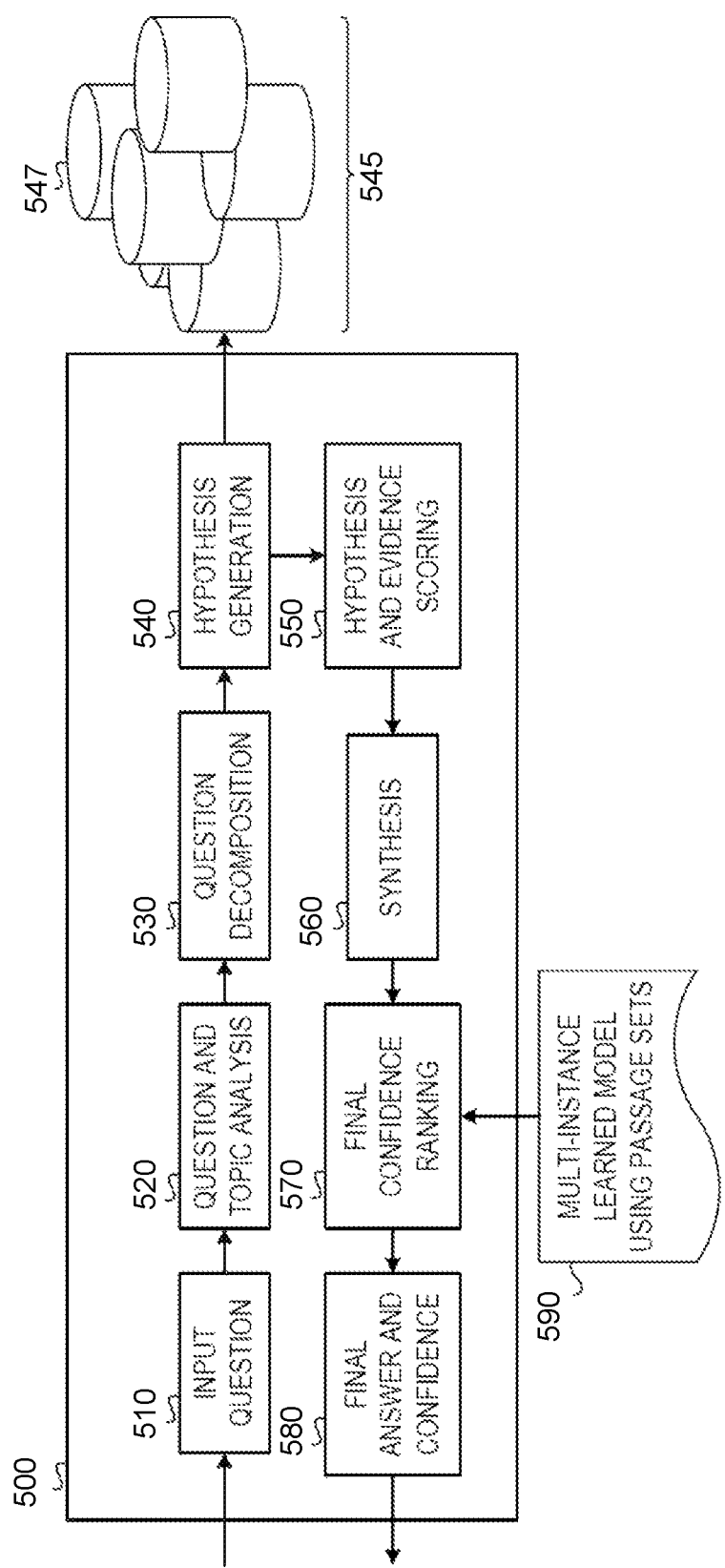
FIG. 5 is a functional block diagram of a question-answering system, according to an embodiment of the invention.

FIG. 5 is a functional block diagram of a question-answering (QA) system pipeline 500 that may be deployed on NLP system 100 (FIG. 1) or NLP system 300 (FIG. 3), according to embodiments of the invention. Referring now to FIG. 5, QA system pipeline 500 processes an input question in accordance with one illustrative embodiment. It should be appreciated that the stages of the QA system pipeline 500 shown in FIG. 5 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline 500 of FIG. 5 is augmented, for example, in one or more of the stages to implement the improved mechanism of the illustrative embodiments described hereafter, additional stages may be provided to implement the improved mechanism, or separate logic from the QA system pipeline 500 may be provided for interfacing with the QA system pipeline 500 and implementing the improved functionality and operations of the illustrative embodiments.

As shown in FIG. 5, the QA system pipeline 500 comprises a plurality of stages 510-580 through which the QA system operates to analyze an input question and generate a final response. In an initial question input stage 510, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 500, i.e. the question and topic analysis stage 520, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 5, the identified major features are then used during the question decomposition stage 530 to decompose the question into one or more queries that are applied to the corpora of data/information 545 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 545. That is, these various sources themselves, different collections of sources, and the like, represent a different corpus 547 within the corpora 545. There may be different corpora 547 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 547 within the corpora 545.

The queries are applied to one or more databases storing information about the electronic texts, documents, articles, websites, and the like, that make up the corpus of data/information. The queries are applied to the corpus of data/information at the hypothesis generation stage 540 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 540, to generate hypotheses for answering the input question. These hypotheses are also referred to herein as "candidate answers" for the input question. For any input question, at this stage 540, there may be hundreds of hypotheses or candidate answers generated that may need to be evaluated.

The QA system pipeline 500, in stage 550, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In the synthesis stage 560, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence ranking stage 570, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 580, a final answer and confidence score, or final set of candidate answers and confidence scores, are generated and output to the submitter of the original input question via a graphical user interface or other mechanism for outputting information.

In the feature-merging approach, there is no way to know what exactly the contribution of an individual passage is to ultimately judging whether a candidate answer is or is not the correct answer. This causes some loss in the overall signal, at best. The loss is likely to intensify when the passages are to be viewed as supporting for the correctness of the proposition underlying a non-factoid question, such as a "yes-no" question.

The illustrative embodiments take advantage of the polar nature of supporting passages, namely, that any passage either justifies or refutes the candidate answer as the correct answer to the question. Note that this holds for both factoid and "yes-no" questions being the focus of the QA pipeline. On that basis, the QA system reinterprets the set of supporting passages returned by the search component. Then, in a training setting, the QA system builds a model specifically adjusted to the partitioning of the passages returned by the search.

The passage sets are associated with different candidate answers. Without feature merging, the QA system cannot train the model within the traditional passage scoring framework. Still, the QA system knows for any given passage set which of the possible alternate scenarios applies to it as a whole: this set of passages does not support the candidate answer as being the correct answer. This judgment is based purely on consulting the ground truth and does not rely on or assume textual occurrence of a candidate answer in a passage. Consequently, that passage still is a potential source of features for a learner.

Instead of feature merging, final confidence ranking stage 570 retains the individuality of supporting passages as a set of evidence that collectively contributes signal to the learner. Each passage is an instance for a classifier, which labels an entire passage set as supports or does not support the correct answer, and even if the learner does not have the instance labels on a per-instance basis, the learner knows the label for the entire set of instances.

Rather than training a supervised learning model from feature vectors derived from passages, multiple instance learned model 590 is trained to perform a different classification task: that of assigning a binary label to a set of supporting passages where the sets do have labels.

The illustrative embodiments propose a shift of granularity of passage assessment and scoring, where on the one hand, passage feature vectors do not get merged (and labeled), and on the other, the feature vectors are for the entire set, containing many passage vectors unlabeled, which the machine learning system seeks to label. This shift of granularity repositions the classification task to one or more appropriate for multiple instance learning. Given a set of labeled sets of passages retrieved by search queries, the machine learning system learns how to label sets and, in effect, distinguishes between correct and incorrect answer candidates, without knowing the actual polarity of the individual supporting passages within the sets, resulting in multi-instance learned model 590.

In essence, the illustrative embodiments recast the problem of passage scoring and hypothesis assessment for candidate answers to actually take advantage of the fact that the machine learning system only possesses incomplete knowledge about how training examples should be labeled.

At runtime for a given input question 510, final confidence ranking stage 570 receives candidate answers with passage sets from hypothesis and evidence scoring stage 550 and synthesis stage 560. Final confidence ranking stage uses multi-instance learned model 590 to establish true or false for each candidate answer using a set of feature vectors corresponding to multiple instances of passages that support or refute the candidate answer.

Referring now to FIGS. 1-2 and 5, according to an embodiment of the invention, NLP system 100 may perform one or more steps of method 200 using one or more processing stages 510-590 of QA system pipeline 500. In one embodiment, QA system pipeline 500 may receive an electronic text input, in question form, at input question stage 510 (step 204), and determine readability indicators in the question, including grammatical errors, misspellings, or slang terms, and a corresponding readability level for the question, at one or more of step 208, step 212, and step 220, in one or more of stages 520-590 in the pipeline.

Based on the question's determined readability level, QA system pipeline 500 may, at one or more stages in the processing pipeline, filter texts in corpora 545 based on readability levels of documents (or portions of documents) in the corpora.

In an embodiment, filtering of documents (or portions of documents) based on their readability levels is performed relatively early in the processing pipeline. This approach may have the advantage of reducing the amount of processing performed at later stages in the pipeline by reducing the number of texts that are used to generate hypotheses and supporting evidence. For example, the filtering may be performed at the question decomposition stage 530, where QA system pipeline 500 generates queries for application to corpora 545 to retrieve text that can then be used to generate hypotheses in stage 540. The queries may be applied, at stage 530, to fewer than every corpus 547 in corpora 545. For example, if a given corpus 547 (or individual documents, or portions thereof) has a readability level that differs from the question's readability level by more than a threshold value, the given corpus 547 may be excluded from the processing performed at stage 530. The readability level used for the given corpus 547, to determine whether it should be filtered, may be a single readability level associated with the entire corpus, or determined by considering readability levels of the various documents in the corpus (or portions thereof). In one example, the readability level used may be the average or median readability level of the documents in the corpus. In a related embodiment, the determination as to whether to include, or exclude, a given document or sets of documents may be performed on a case-by-case basis.

In another embodiment, filtering of documents (or portions documents) based on their readability levels is performed relatively late in the processing pipeline. This approach may have the advantage of considering texts, at least initially, regardless of their readability levels, to arrive at the most relevant and accurate answer, and to apply readability level considerations as an additional consideration during the later stage. This approach allows QA system pipeline 500 to weigh relevance and accuracy considerations against readability level considerations at a processing stage where QA system pipeline 500 has gathered all the necessary data to make an informed decision. In one example, QA system pipeline 500 may perform later-stage filtering at the final confidence ranking stage 570 or final answer and confidence stage 580. That is, prior to outputting (for example, prior to displaying answers to a user), QA system pipeline 500 may, at stage 570, consider an answer's readability level, alone or in conjunction with its relevance to the question, in ranking the answer. Additionally, or alternatively, QA system pipeline 500 may, at stage 580, filter from the potential answers to the question any answer whose readability level differs from that of the question by more than a threshold value, regardless of ranking operations at stage 570.

In other embodiments, filtering may be performed at one or more stages other than those described above. Additionally, filtering may be performed during multiple processing stages. In a related embodiment, filtering may be performed by the same stage in QA system pipeline as the stage that executes Function 1, described above in connection with FIGS. 3-4.

Figure 6:
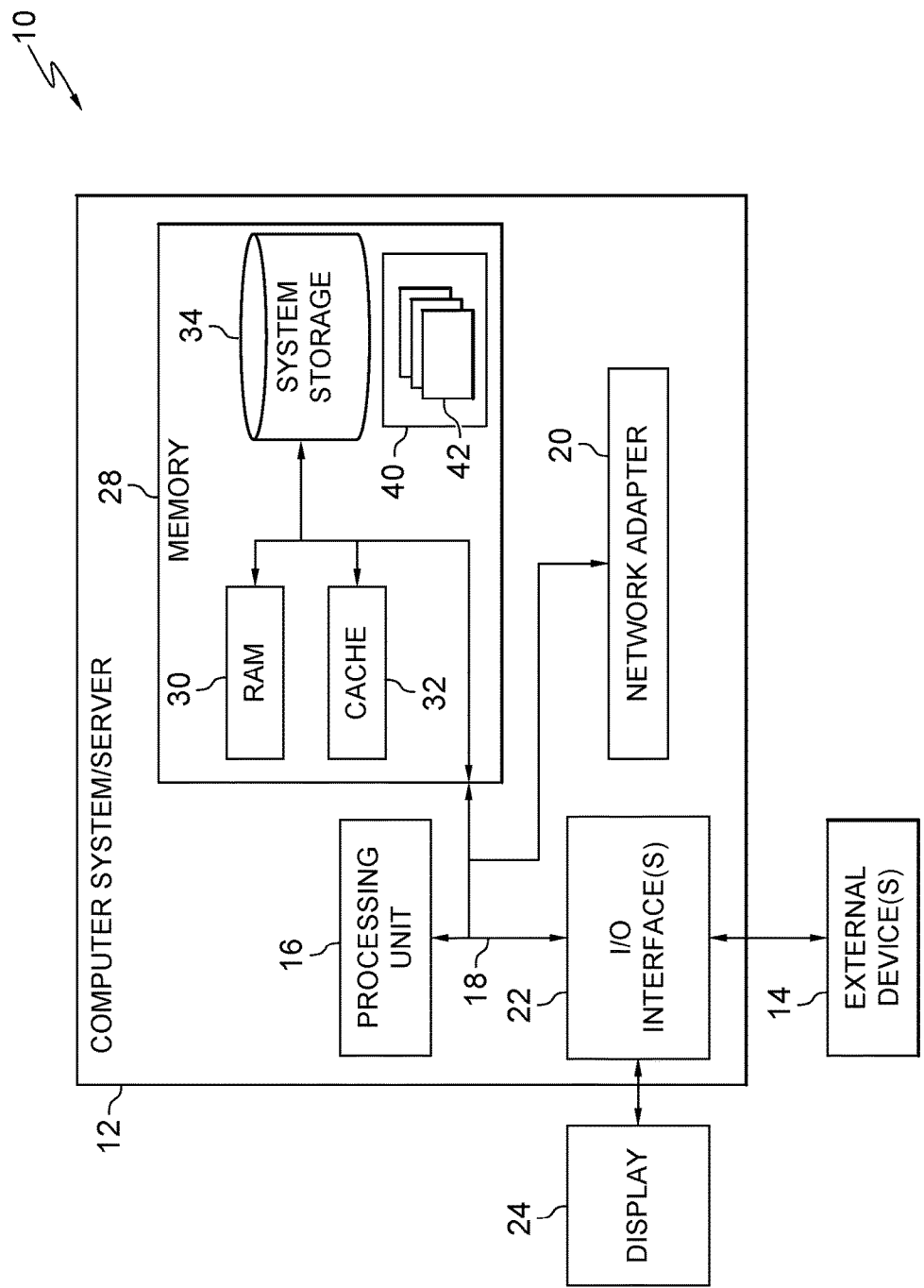
FIG. 6 is a functional block diagram of a cloud computing node, such as the computing systems in FIGS. 1 and 3, according to an embodiment of the invention.

Referring now to FIG. 6, a schematic of an example of a cloud computing node 10 (which may be, for example, computer 102 in FIG. 1, or computer 302 in FIG. 3) is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
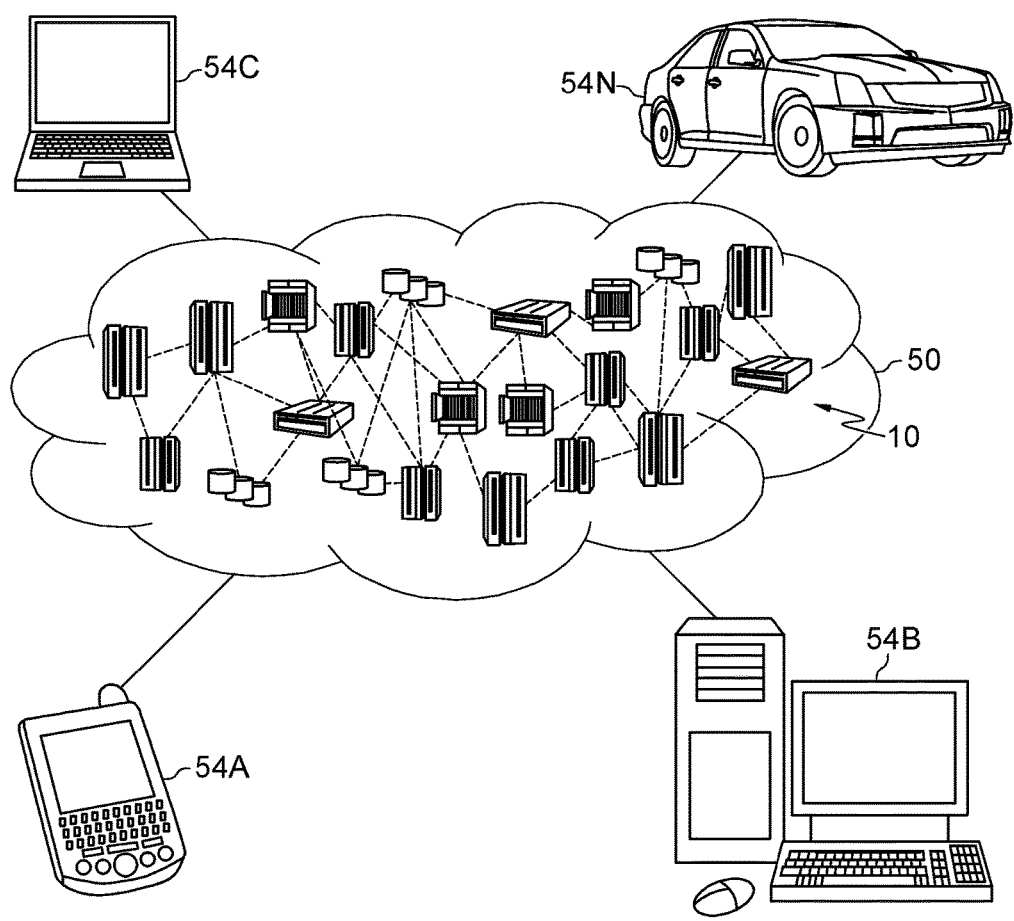
FIG. 7 is a functional block diagram of an illustrative cloud computing environment, including the cloud computing node of FIG. 6, according to an embodiment of the invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that cloud computing nodes 10 and cloud computing environment 50 can communicate with any type of computerized device over any type of network and/or network addressable connection (e.g., using a web browser).

Figure 8:
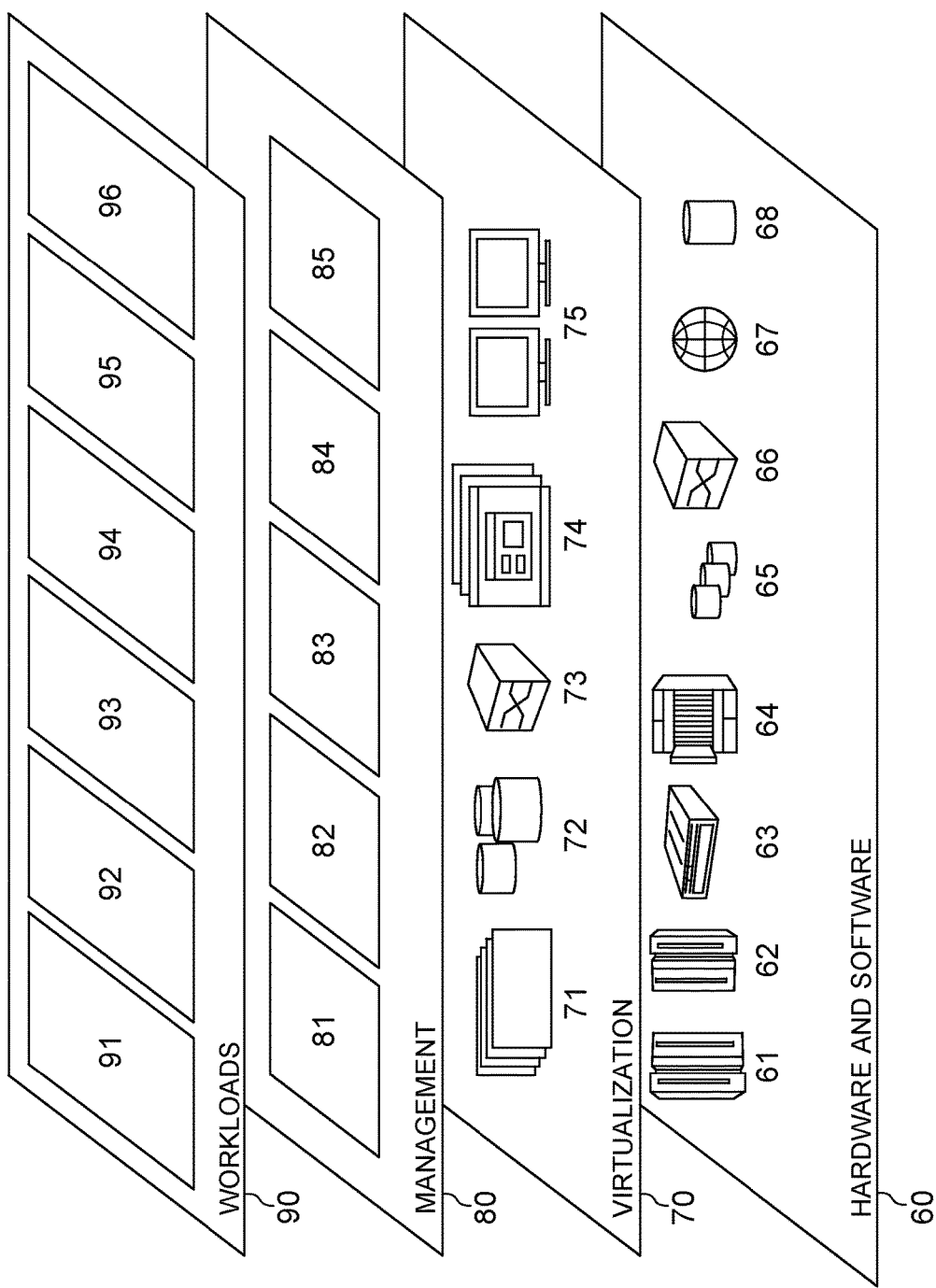
FIG. 8 is a functional block diagram of functional layers of the cloud computing environment of FIG. 7, according to an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; natural language processing 96, including those described in connection with FIGS. 1-4, above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for electronic natural language processing in an electronic natural language processing (NLP) system, comprising:
receiving an electronic text input;
determining a readability level indicator of the electronic text input, wherein the readability level indicator comprises at least one of a grammatical error, a slang term, and a misspelling type in the electronic text input, and wherein determining the readability level indicator comprises identifying at least one of a slang term and a misspelling in the electronic text input, and wherein identifying at least one of a slang term and a misspelling comprises identifying, in the electronic text input, one or more of:
an abbreviation of a word corresponding to an acronym associated with the word in a collection of text messaging acronyms; and
a misspelling of the word, wherein the misspelling corresponds to a phonetic reading of the word; and
determining a readability level of the electronic text input based on the readability level indicator.

2. The method of claim 1, further comprising:
receiving the electronic text input from an electronic input source in response to an input from a user.

3. The method of claim 1, further comprising:
identifying the electronic text input as a question.

4. The method of claim 3, further comprising:
generating a plurality of candidate answers for the question; and
selecting a set of candidate answers from among the plurality of candidate answers based on matching readability levels of the set of candidate answers to the readability level of the question.

5. The method of claim 1, further comprising:
parsing the electronic text input using a full parsing process.

6. The method of claim 1, further comprising:
comparing the readability indicators of the electronic text input with readability indicators of one or more questions in a corpus of questions,
wherein determining the readability level for the electronic text input is based on readability levels of the one or more questions.

7. The method of claim 6, further comprising:
training a natural language processing model based on the results of the comparison.

8. A computer system for electronic natural language processing, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
receiving an electronic text input;
determining a readability level indicator of the electronic text input, wherein the readability level indicator comprises at least one of a grammatical error, a slang term, and a misspelling type in the electronic text input, and wherein instructions for determining the readability level indicator comprises instructions for identifying at least one of a slang term and a misspelling in the electronic text input, and wherein identifying at least one of a slang term and a misspelling comprises instructions for identifying, in the electronic text input, one or more of:
an abbreviation of a word corresponding to an acronym associated with the word in a collection of text messaging acronyms; and
a misspelling of the word, wherein the misspelling corresponds to a phonetic reading of the word; and
determining a readability level of the electronic text input based on the readability level indicator.

9. The system of claim 8, wherein the program instructions further comprise instructions for:
training a natural language processing model based on the results of the comparison.

10. The system of claim 8, wherein the program instructions further comprise instructions for:
receiving the electronic text input from an electronic input source in response to an input from a user.

11. The system of claim 8, wherein the program instructions further comprise instructions for:
identifying the electronic text input as a question.

12. The system of claim 8, wherein the program instructions further comprise instructions for:
generating a plurality of candidate answers for the question; and
selecting a set of candidate answers from among the plurality of candidate answers based on matching readability levels of the set of candidate answers to the readability level of the question.

13. The system of claim 8, wherein the program instructions further comprise instructions for:
parsing the electronic text input using a full parsing process.

14. The system of claim 8, wherein the program instructions further comprise instructions for:
comparing the readability indicators of the electronic text input with readability indicators of one or more questions in a corpus of questions,
wherein determining the readability level for the electronic text input is based on readability levels of the one or more questions.

15. A computer program product for electronic natural language processing, comprising a non-transitory tangible storage device having program code embodied therewith, the program code executable by a processor of a computer to perform a method, the method comprising:

receiving an electronic text input, by the computer;

determining, by the computer, a readability level indicator of the electronic text input, wherein the readability level indicator comprises at least one of a grammatical error, a slang term, and a misspelling type in the electronic text input, and wherein determining the readability level indicator comprises identifying, by the computer, at least one of a slang term and a misspelling in the electronic text input, and wherein identifying at least one of a slang term and a misspelling comprises identifying, by the computer, in the electronic text input, one or more of:

an abbreviation of a word corresponding to an acronym associated with the word in a collection of text messaging acronyms; and a misspelling of the word, wherein the misspelling corresponds to a phonetic reading of the word; and determining, by the computer, a readability level of the electronic text input based on the readability level indicator.

16. The computer program product of claim 15, wherein the method further comprises:

generating, by the computer, a plurality of candidate answers for the question; and selecting, by the computer, a set of candidate answers from among the plurality of candidate answers based on matching readability levels of the set of candidate answers to the readability level of the question.

17. The computer program product of claim 15, wherein the method further comprises:

identifying, by the computer, the electronic text input as a question.

18. The computer program product of claim 15, wherein the method further comprises:

receiving the electronic text input, by the computer, from an electronic input source in response to an input from a user.

* * * * *